(12) United States Patent
Yun (10) Patent No.: US 7,263,701 B2
(45) Date of Patent: Aug. 28, 2007

(54) INTERPROCESS COMMUNICATION METHOD AND APPARATUS

(75) Inventor: Yeong-Hyun Yun, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 552 days.

(21) Appl. No.: 10/233,422

(22) Filed: Sep. 4, 2002

(65) Prior Publication Data

US 2003/0131135 A1  Jul. 10, 2003

Related U.S. Application Data

(60) Provisional application No. 60/316,301, filed on Sep. 4, 2001.

(30) Foreign Application Priority Data

Jul. 16, 2002   (KR) ............................. 2002-41671

(51) Int. Cl.
| | |
|---|---|
| G06G 3/00 | (2006.01) |
| G06F 9/44 | (2006.01) |
| G06F 9/46 | (2006.01) |
| G06F 13/00 | (2006.01) |

(52) U.S. Cl. ..................... 719/313; 719/314
(58) Field of Classification Search ......... 719/310–320
See application file for complete search history.

(56) References Cited

U.S. PATENT DOCUMENTS 5,682,534 A    10/1997  Kapoor et al.
6,012,084 A *  1/2000  Fielding et al. ............. 709/205
6,745,389 B1 * 6/2004  Hostyn et al. ............... 719/315
2002/0144010 A1 * 10/2002 Younis et al. ............... 719/314

FOREIGN PATENT DOCUMENTS

EP         600235 A1 *  6/1994
EP       0 767 563 A2    4/1997

(Continued)

OTHER PUBLICATIONS

Hagen et al, Beyond the Black Box: Event-based Inter-Process communication in Process Support Systems, Technical report No. 303, ETH Zurich, Department of Computer Science, 1999, pp. 1-17.*

(Continued)

*Primary Examiner*—William Thomson
*Assistant Examiner*—Diem Ky Cao
(74) *Attorney, Agent, or Firm*—Robert E. Bushnell, Esq.

(57) ABSTRACT

An interprocess communication method for transporting messages from an originating place to a terminating place comprises the steps of: providing an operating system-unified interface function, at an operating system independent access (OIA) layer, which is independently accessible to operating systems of a communication apparatus; providing a device-unified interface function, at a device independent access (DIA) layer, which is independently accessible to physical devices of the communication apparatus; and transporting messages, at a unified interprocess communication (UIPC) layer, from the originating place to the terminating place through at least one of the operating system independent access layer and the device independent access layer using information about the terminating place that is provided by a terminating place task, and using a common task architecture based on the task's basic common control flow.

16 Claims, 6 Drawing Sheets

FOREIGN PATENT DOCUMENTS

| | | | |
|---|---|---|---|
| EP | 0 767 563 | A3 | 10/1998 |
| JP | 9-16085 | | 6/1997 |
| JP | 10-78881 | | 3/1998 |

OTHER PUBLICATIONS

Sun Microsystem, Overview of Networking, Networking Basics, pp. 1-3.*

Tanenbaum, Computer Networks, Prentice-Hall, Inc., 1996, pp. 28-32.*

Alexander Schill; "Aktuelle Standards und neue Technologien in heterogenen Workstation-Netzen"; Oldenbourg Verlag, vol. 37, No. 1, pp. 38-45, Feb. 1995.

Sun Microsystems, Inc., XP-002915168; "RPC: Remote Procedure Call Protocol Specification"; Internet Specification RFC, pp. 1-24, Apr. 1988.

Andrew D. Birrell et al., XP-002074181; "Implementing Remote Procedure Calls"; ACM Transactions on Computer Systems, vol. 2, No. 1, pp. 39-59, Feb. 1984.

*European Search Report* issued in Applicant's corresponding European Application No. EP 02 01 9789 (dated Apr. 1, 2004).

Japanese Office Action issued by the Japanese Patent Office in applicant's corresponding Japanese Patent Application No. 2002-258908, issued on Aug. 29, 2005.

International Telecommunication Union publication, ITU-T Recommendation X.200 (Jul. 1994), "*Data Networks and Open System Communications—Open Systems Interconnection—Service Definitions*".

International Telecommunication Union publication, ITU-T Recommendation X.212 (Nov. 1995), "*Data Networks and Open System Communications—Open Systems Interconnection—Service Definitions*".

International Telecommunication Union publication, ITU-T Recommendation X.213 (Nov. 1995), "*Data Networks and Open System Communications—Open Systems Interconnection—Model And Notation*".

International Telecommunication Union publication, ITU-T Recommendation X.214 (Nov. 1995), "*Data Networks and Open System Communications—Open Systems Interconnection—Service Definitions*".

\* cited by examiner

INTERPROCESS COMMUNICATION METHOD AND APPARATUS

CLAIM OF PRIORITY

This application makes reference to, incorporates the same herein, and claims all benefits accruing under 35 U.S.C. §119 from a provisional application for UNIFIED INTERPROCESS COMMUNICATION earlier filed under 35 U.S.C. §111(b) in the United States Patent & Trademark Office on the 4 of Sep. 2001 and there duly assigned Ser. No. 60/316,301, and from my application UNIFIED INTERPROCESS COMMUNICATION filed with the Korean Industrial Property Office on 16 Jul. 2002 and there duly assigned Serial No. 2002-41671.

BACKGROUND OF THE INVENTION

1. Technical Field

The present invention relates generally to a communication system performing interprocess communication (IPC), and more particularly relates to a unified interprocess communication (UIPC) method and apparatus, with the method and apparatus being independent of physical communication devices and an operating system.

2. Related Art

Interprocess communication (IPC) has used a variety of methods for interprocess message communication, for example, pipe, semaphore, message queue, or shared memory. These methods were all based on operating systems. Therefore, it was possible to provide diverse interprocess communication (IPC) methods having the basis on the operating systems. In other words, interprocess communication (IPC) methods were dependent on the operating systems, In consequence, every time interprocess communication (IPC) and process are to be implemented, an application software had to be changed according to the operating system used in a communication system. Also, in the case of interprocess communication (IPC) between hardware devices, different physical device drivers were used for different physical devices. Thus, for a process using the device driver, interprocess communication (IPC) function had to be changed in accordance with the kind of device driver in use.

Such interprocess communication (IPC) methods in a communication system were dependent on operating systems and physical devices. As a result, as the operating system and physical devices used in the communication system were changed, overhead costs were incurred repeatedly. This not only deteriorated reusability and portability of the software, but also burdened related industries with time and cost to develop a new communication system.

I have found that it would be desirable to use an improved interprocess communication method and an improved interprocess communication apparatus which can be operated with any physical communication device and with any operating system. The improved method and improved apparatus are advantageous because they do not need to be customized for different operating systems and do not need to be modified for use with different physical communication devices.

SUMMARY OF THE INVENTION

It is, therefore, an object of the present invention to provide a flexible and unified interprocess communication method and apparatus, which are independent of operating systems and physical devices for communication system.

Another object of the present invention is to provide a unified interprocess communication method and apparatus which are capable of performing interprocess communication with high reusability and portability, regardless of the operating systems used in the communication system.

Still another object of the present invention is to provide a unified interprocess communication method and apparatus which are independent of physical devices used in the communication system.

Yet another object of the present invention is to provide a communication apparatus for transporting messages from an originating place to a terminating place, regardless of the kind of communication methods (e.g., asynchronous transfer mode (ATM), Internet protocol (IP), synchronous digital hierarchy (SDH), and others) used in the communication apparatus.

To achieve the above objects, there is provided a communication method for transporting messages from an originating place to a terminating place, including the steps of: providing an operating system-unified interface function, at an operating system independent access (OIA) layer, which is independently accessible to operating systems of a communication apparatus; providing a device-unified interface function, at a device independent access (DIA) layer, which is independently accessible to physical devices of the communication apparatus; and transporting messages, at a unified interprocess communication (UIPC) layer, from the originating place to the terminating place through at least one of the operating system independent access layer and the device independent access layer using information about the terminating place that is provided by a terminating place task, and using a common task architecture based on the task's basic common control flow.

Another aspect of the present invention provides a communication apparatus for transporting messages from an originating place to a terminating place, the apparatus including: an operating system independent access (OIA) layer for providing an operating system-unified interface function, which is independently accessible to operating systems of a communication apparatus; a device independent access (DIA) layer for providing a device-unified interface function which is independently accessible to physical devices of the communication apparatus; and a unified interprocess communication (UIPC) layer for transporting messages from the originating place to the terminating place through at least one of the operating system independent access layer and the device independent access layer using information about the terminating place which is provided by a terminating place task, and using a common task architecture based on the task's basic common control flow.

In the embodiment of the present invention, the three terms "process", "application", and "task" are used interchangeably, and they mean the task existing on an upper portion of the unified interprocess communication (UIPC) layer.

To achieve these and other objects in accordance with the principles of the present invention, as embodied and broadly described, the present invention provides an interprocessor communication method for transporting messages from an originating place to a terminating place, the method comprising: providing an operating system-unified interface function at an operating system independent access (OIA) layer, the operating system-unified interface function being independently accessible to operating systems of a communication apparatus; providing a device-unified interface function at a device independent access (DIA) layer, the device-unified interface function being independently accessible to physical devices of the communication apparatus; and, at a unified interprocess communication (UIPC) layer, transporting messages from the originating place to the terminating place through at least one layer selected from the operating system independent access layer and the device independent access layer, said transporting being performed in accordance with information corresponding to the terminating place provided by a terminating place task, said transporting being performed in accordance with a common task architecture based on a basic common control flow of the terminating place task.

To achieve these and other objects in accordance with the principles of the present invention, as embodied and broadly described, the present invention provides an interprocessor communication apparatus for transporting messages from an originating place to a terminating place, the apparatus comprising: an operating system independent access (OIA) layer providing an operating system-unified interface function which is independently accessible to operating systems of a communication apparatus; a device independent access (DIA) layer providing a device-unified interface function which is independently accessible to physical devices of the communication apparatus; and a unified interprocess communication (UIPC) layer transporting messages from the originating place to the terminating place through at least one layer selected from the operating system independent access layer and the device independent access layer, said transporting being performed in dependence upon information corresponding to the terminating place, the information being provided by a terminating place task, the unified interprocess communication layer using a common task architecture based on the basic common control flow of the terminating place task.

To achieve these and other objects in accordance with the principles of the present invention, as embodied and broadly described, the present invention provides an interprocessor communication method for transporting messages from an originating place to a terminating place, the method comprising: providing a common task architecture having a basic common control flow of a task as an interface for unified interprocess communication (UIPC); when an originating task provides a message and provides information corresponding to the terminating place using the common task architecture, identifying when the message corresponds to an intraprocessor communication within a card and determining when the message corresponds to an interprocessor communication between different cards, said identifying and determining being performed in dependence upon the information corresponding to the terminating place; when the message corresponds to the interprocessor communication between the different cards, transporting the message to a queue of a unified interprocess communication protocol stack for routing; and when the message corresponds to the intraprocessor communication within the card, transporting the message to a message queue of a corresponding task in the card through an application program interface library provided by an operating system independent access (OIA) layer.

To achieve these and other objects in accordance with the principles of the present invention, as embodied and broadly described, the present invention provides an interprocessor communication apparatus for transporting messages from an originating place to a terminating place, the apparatus comprising: an operating system block for independently processing internal communications in the apparatus; and a hardware block for independently processing external communications to and from the apparatus.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that, in the development of any actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

The following four items of literature disclose background and additional information that are helpful for understanding the principles of the present invention: (1) Open Systems Interconnection, Basic Reference Model, ITU-T X. 200; (2) Open Systems Interconnection, Data Link Service Definition, ITU-T X. 212; (3) Open Systems Interconnection, Network Service Definition, ITU-T X. 213; and (4) Open Systems Interconnection, Transport Service Definition, ITU-T X. 214.

Figure 1:
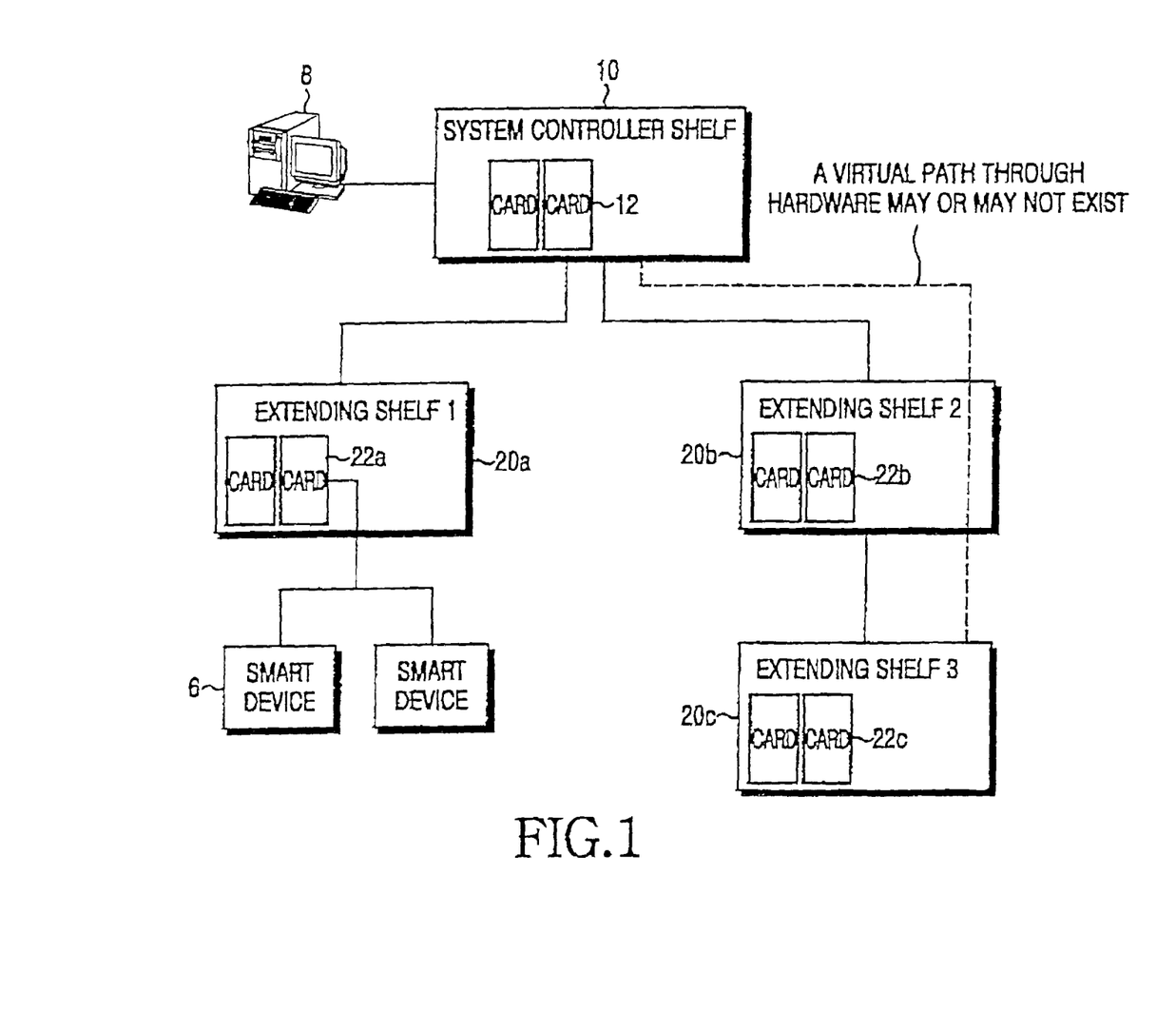
FIG. 1 is a schematic diagram of a network for exchanging messages between each shelf in accordance with a preferred embodiment of the present invention.

FIG. 1 is a schematic diagram of a network for exchanging messages between each shelf embodying the principles of the present invention. Network topology depicted in the drawing includes an element management system (EMS) 8, a system controller shelf 10 equipped with a plurality of cards including a card 12, a first extending shelf 20a equipped with smart devices 6 and a plurality of cards including a card 22a, a second extending shelf 20b equipped with a plurality of cards including a card 22b, and a third extending shelf 20c equipped with a plurality of cards including a card 22c.

Referring to FIG. 1, for the third extending shelf 20c to be able to communicate with the system controller shelf 10, although the communication between the third extending shelf 20c and the system controller shelf 10 could pass through the second extending shelf 20b physically, a virtual direct path exists between the third extending shelf 20c and the system controller shelf 10, according to the principles of the present invention.

FIG. 1 is prepared primarily for explaining the network configuration to which the unified interprocess communication (UIPC) function of the present invention is applied. The unified interprocess communication (UIPC) of the present invention is roughly described here, even though it will be detailed later with reference to FIG. 2. It supports message exchange between tasks in each card, between tasks on different cards in the same shelf, and between tasks in a certain shelf and attached smart devices 6 (for example, a digital subscriber line modem and unified access devices). It should be noted that the above described function is based on an assumption that, if necessary, the system controller shelf 10 decides paths for messages to be transported between two shelves. This simplifies the overall protocol, and reduces overhead which is related to protocols like Internet Protocol (IP) dealing with a more generalized network topology. Also, messages can be sent to a path between the element management system (EMS) 8 and a certain card in a shelf. As far as the unified interprocess communication (UIPC) is concerned, an element management system (EMS) 8 acts like another shelf.

Figure 2:
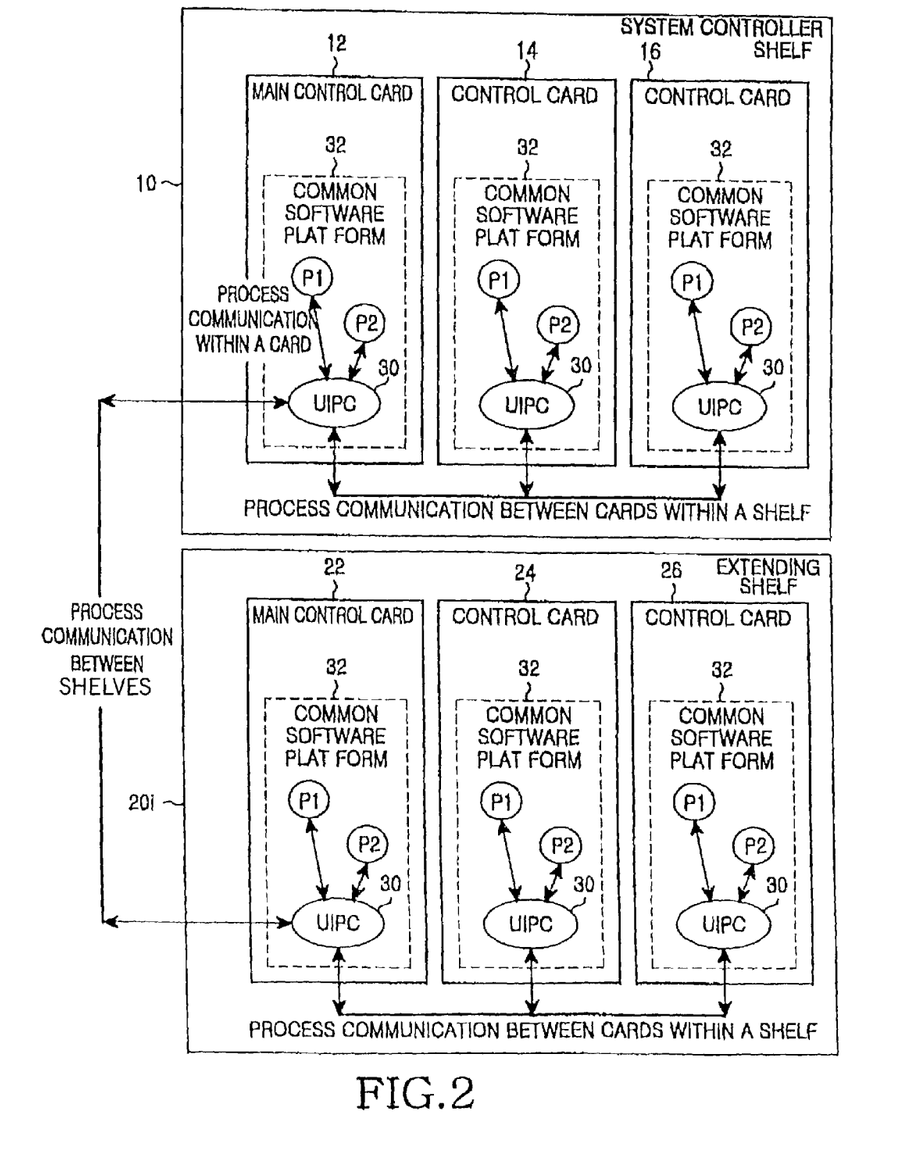
FIG. 2 is an exemplary diagram of a detailed configuration of a communication system to which unified interprocess communication (UIPC) is applied in accordance with the preferred embodiment of the present invention.

FIG. 2 illustrates a detailed configuration of a communication system to which the unified interprocess communication (UIPC) function of the present invention is applied. Extending shelf 20i shown in FIG. 2 is one of the plurality of extending shelves depicted in FIG. 1, and system controller shelf 10 is a shelf for controlling the plural extending shelves 20a, 20b, and 20c. Shelf 10 includes a plurality of control cards 14 and 16, and a main control card 12 for controlling the control cards 14 and 16. Shelf 20i includes a plurality of control cards 24 and 26, and a main control card 22 for controlling the control cards 24 and 26.

Every control card 14, 16, 24, and 26, and the main control card 12, 22 are provided with unified interprocess communication (UIPC) 30 as part of the components of common software platform 32 for interprocess message communication. Unified interprocess communication (UIPC) 30 is a means for providing a path for message communication between processes in the cards, between the cards, in the shelves, and between the shelves. Each unified interprocess communication (UIPC) 30 is connected to processes (application tasks) like P1, P2 shown in FIG. 2.

Unified interprocess communication (UIPC) 30, as shown in FIG. 2, is provided in three kinds of formats: "process communication within cards (intraprocessor communication)", "process communication between cards within a shelf (interprocessor communication)", and "process communication between shelves (interprocessor communication)".

Particularly, "process communication between cards within a shelf (interprocessor communication)", and "process communication between shelves (interprocessor communication)" require a separate physical device driver.

Figure 3:
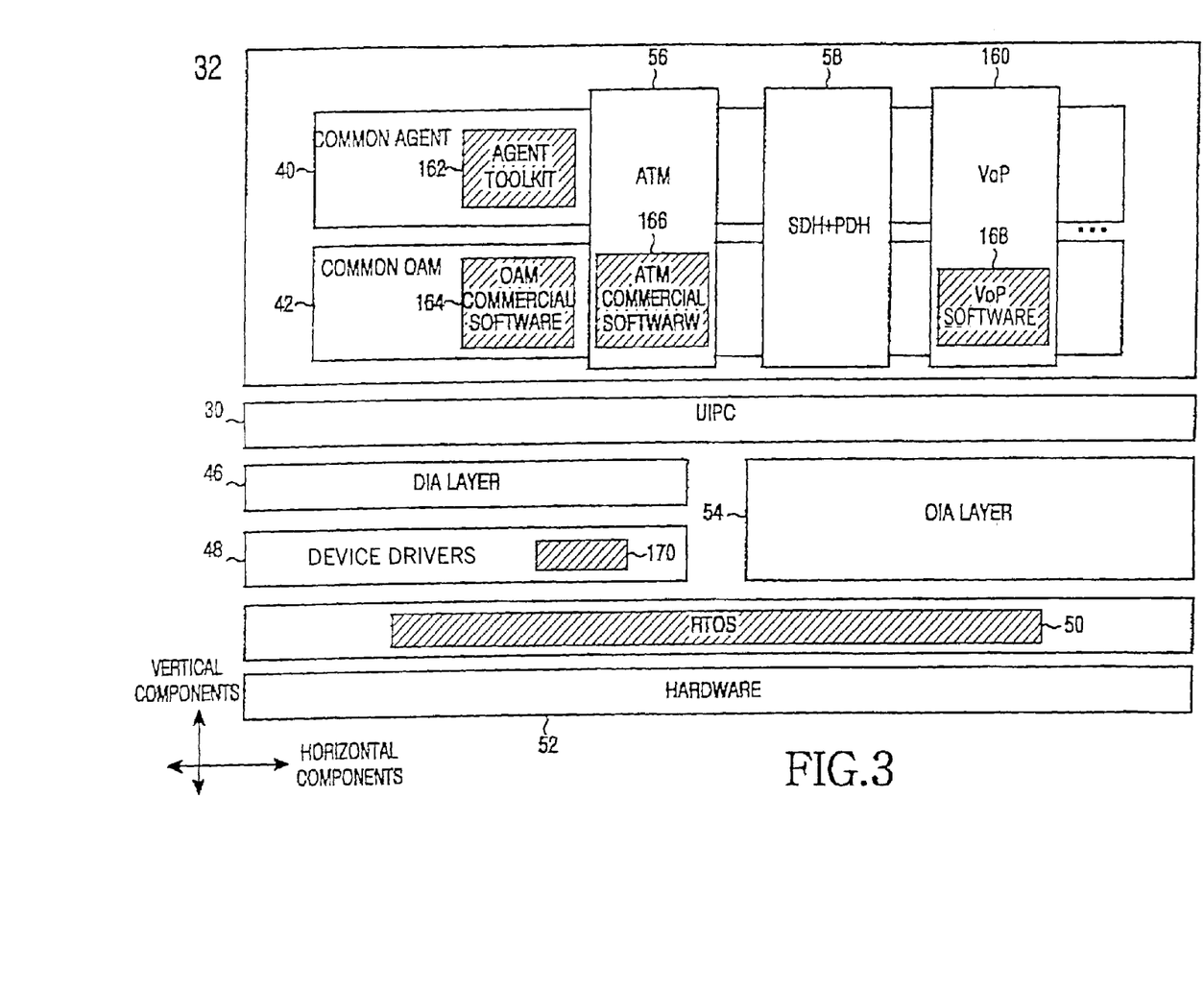
FIG. 3 is a block diagram of a common software platform which includes the unified interprocess communication (UIPC) as a component in accordance with the preferred embodiment of the present invention.

FIG. 3 is a block diagram of a common software platform partially including the unified interprocess communication (UIPC) embodying the principles of the present invention as a component. Common software platform 32 depicted in FIG. 3 is software for providing general and common functions which are applicable to a number of different communication systems. The common software platform 32 exists in each card 12, 14, 16, 22, 24, and 26 within the shelves 10, 20i illustrated in FIG. 2, and its components are divided into a plurality of functional units.

As FIG. 3 shows, the common software platform 32 is largely divided into components which are horizontally arrayed (hereinafter, they are referred to as "horizontal components"), and components which are vertically arrayed (hereinafter, they are referred to as "vertical components"). More specifically, the horizontal components, such as, common agent 40, common operation administration and maintenance (OAM) 42, UIPC (unified interprocess communication) 30, DIA (Device Independent Access) layer 46, physical device drivers 48, RTOS (Real Time Operating System) 50, and hardware 52, are common functional blocks required by all kinds of communication systems, and their particular technical functions are provided by the vertical components. On the other hand, the vertical components, such as, ATM (Asynchronous Transfer Mode) 56, SDH (Synchronous Digital Hierarchy)+PDH (Plesiochronous Digital Hierarchy) 59, and VoP (Voice over Packet) 160, are technical functional blocks which are required, depending on the kind of communication system. Similar to before, the technical functions of the vertical components are provided by the horizontal components, and they are variable in accordance with the kind of communication system. For example, the common operation administration and maintenance (OAM) 42, among the other horizontal components, particularly gives the alarm, collects performance data, and manages the performance data for administration and maintenance of the communication system. Therefore, if the common operation administration and maintenance (OAM) 42 does something in connection with ATM, like giving an ATM related alarm or collecting performance data for an ATM related communication system, one of the vertical components, ATM 56 to be precise, provides the data. In FIG. 3, the functional blocks 50, 162, 164, 166, 168, and 170 with slashed lines are utilized in case commercial software is used or added.

The upper blocks, that is, from "common agent 40" to "common OAM 42" shown in FIG. 3 are dependent on the application of software.

Normally, various communication systems include a common software platform 32 like the one illustrated in FIG. 3, and all applications which a communication system tries to implement in the future would be developed in the form of a combined function of the vertical components and the horizontal components provided by the common software platform 32.

The following explains specific functions of the horizontal components of the common software platform 32 shown in FIG. 3

Operating System Independent Access Layer (OIA Layer) 54

It provides an operating system (OS) unified interface function for the implementation of application and unified interprocess communication (UIPC) 30, making independent OS access possible without relying upon any operating system (OS) like RTOS 50. As a result, portability of the application and unified interprocess communication (UIPC) 30 is enhanced. In other words, the software application and unified interprocess communication (UIPC) 30 can be reused for different operating systems in different communication systems.

Device Independent Access Layer (DIA Layer) 46

By hiding the more concrete part of the physical device drivers 48, it provides a common model for a variety of devices, that is, a device unified interface function, which enables independent access to diverse devices without relying upon the devices. Because of the DIA layer 46, it is now possible to reuse the application and unified interprocess communication (UIPC) 30/OTA layer 54, even when hardware chips like the hardware 52 illustrated in F10. 3 are changed.

Unified Interprocess Communication (UIPC) 30

By hiding detailed information about interprocess communication (IPC) mechanism in conforming to the operating system for interprocess communication, and underlying software like RTOS 50, and underlying hardware 52, no separate task is needed, especially when the operating system is changed to implement an application.

Common Operation, Administration & Maintenance (Common OAM) 42

It provides a common method for operation, administration and maintenance of various kinds of communication systems.

Common Agent Software 40

It provides an interface for an external network operating system for a more effective network operation in a communication system.

In short, the common software platform 32, by providing common functions without pursuing a particular function, exists primarily for the implementation of a software architecture that is reusable for various kinds of communication systems, and is independent of operating systems and hardware devices. In addition, unified interprocess communication (UIPC) 30 is one of the components of the common software platform 32 for implementing an interprocess message communication method.

So far, the common software platform 32 has been described for a better understanding of the present invention. From this point, the unified interprocess communication (UIPC) 30 configuration and its functions will be explained in detail.

Unified interprocess communication (UIPC) 30, similar to the one in FIG. 2. works in every control unit, that is, the control cards 12, 14, 16, 22, 24, and 26. Mainly, it provides a message communication function between processes within a card, within a shelf, or in different shelves.

Required for message communications through the unified interprocess communication (UIPC) 30 of the present invention are application ID (application identifier) (APP_ID), and a network address N_ADDR. Application identifier APP_ID is an identifier for distinguishing a relevant process to communicate, and network address N_ADDR is an address value representing a physical address of the relevant process. The network address N_ADDR has a size of 4 octets, and comprises rack-shelf-slot-port information. Therefore, the physical address of a corresponding process is easily obtained by using the network address N_ADDR. Network address N_ADDR uses a shelf and slot (where a card is mounted) identifier only for the unified interprocess communication (UIPC) 30, and the rack and port identifier are used for different purposes. Again referring to FIG. 2, consider an example in which a message is transmitted from process 1 (P1) in the main control card 12 of the system controller shelf 10 to process 1 (P1) in the main control card 22 of the extending shelf 20i. If the identifier of the system controller shelf 10 is "l", the identifier of the extending shelf 20i is "2", and the slot identifier of the main control card 12, 22 is "22". First of all, the originating place and the terminating place application identifier APP_ID is P1, respectively. Then, the originating network address N_ADDR is hexadecimal, "0x00010200" (rack-shelf-slot-port), and the terminating network address N_ADDR is hexadecimal, "0x00020200" (rack-shelf-slot-port). When the network address N_ADDR, and the application identifier APP_ID are compared to the Internet protocol (IP), it is found that the network address N_ADDR similarly corresponds to an IP address, and the application identifier APP_ID to a port number of TCP (Transmission Control Protocol).

The following are the functions of the unified interprocess communication (UIPC) 30 embodying the principles of the present invention.

UIPC 30 transports a bi-directional message to tasks anywhere in network components.

UIPC 30 permits an application to transmit messages asynchronously. API (Application Program Interface) gives an immediate response without blocking.

UIPC 30 allows tasks to transport messages, and to respond synchronously, taking a time-out.

UIPC 30 extracts an underlying physical transport mechanism.

UIPC 30 provides a mechanism for broadcasting messages.

UIPC 30 makes lower level UIPC protocols changeable without changing upper layer protocols, and vice versa.

UIPC 30 detects transmission errors on a link-to-link basis, and performs a retrial on the errored packets. This means that a data link layer of the protocol for handling each link should be able to make reliable links.

Common unified interprocess communication (UIPC) application program interface (API) is used for intraprocessor communication and external process communication.

Common unified interprocess communication (UIPC) 30 partitions and reassembles high capacity messages.

UIPC 30 provides a mechanism enabling a debug output.

UIPC protocol parameters are settable during the run-time as well.

UIPC 30 provides a mechanism for designating a maximum transport unit for each link.

UIPC 30 accommodates links having variable maximum transport units.

UIPC 30 supports a message priority concerning real-time critical messages.

UIPC 30 is independent of operating systems (OS).

UIPC 30 makes messages from the controller pass through transparently, and eventually arrive at the devices that are attached to the cards.

Although unified interprocess communication (UIPC) 30 transports messages from an originating place to a destination, it acts as an application as far as the contents of the messages are concerned. Thus, no presentation mechanism is provided for a particular system message. The presentation mechanism of system messages is like a presentation layer, but the unified interprocess communication (UIPC) 30 according to the present invention does not include the presentation layer because the unified interprocess communication (UIPC) 30 aims for real-time protocol.

Figure 4:
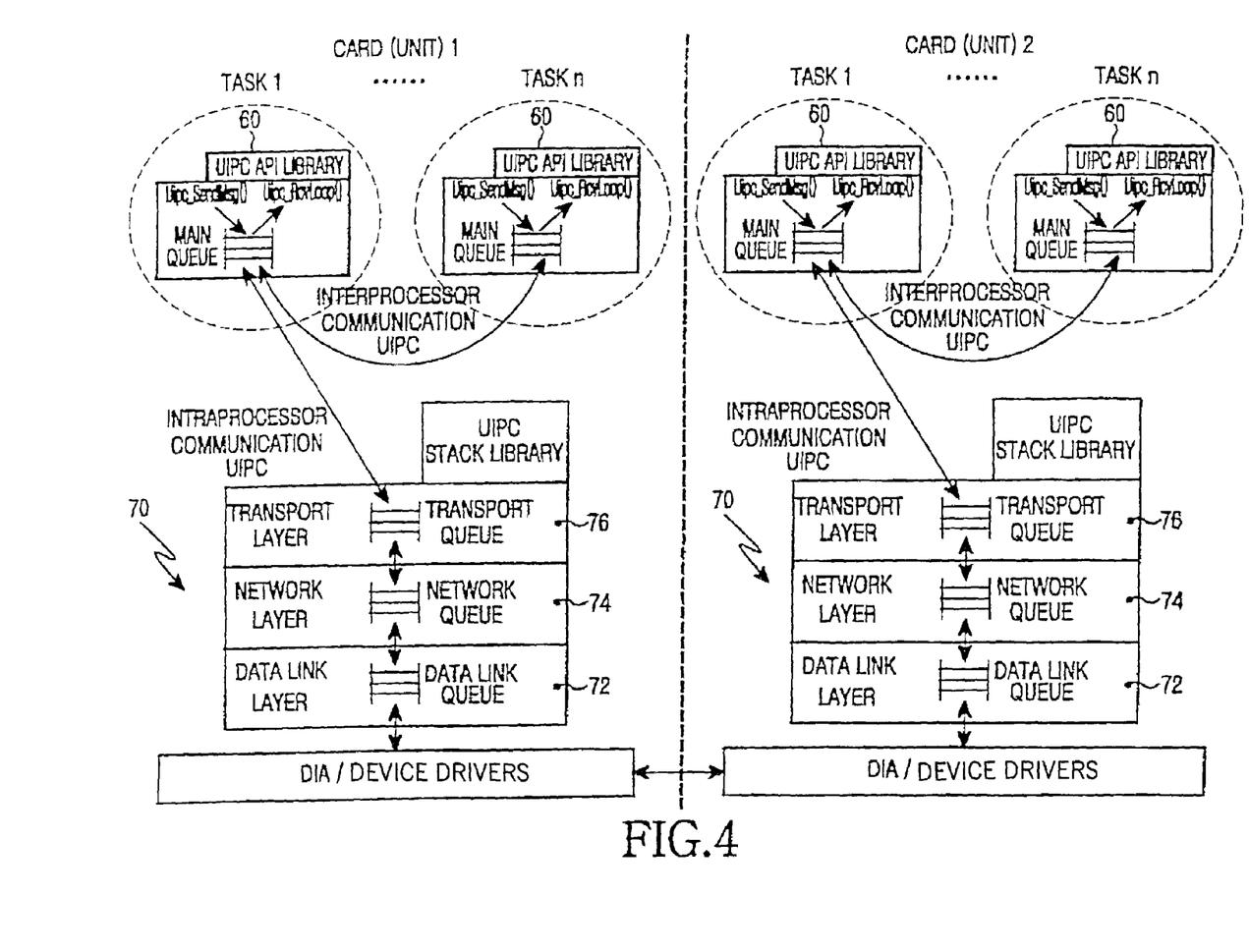
FIG. 4 is a diagram representing unified interprocess communication (UIPC) configuration per card (per unit) in accordance with the preferred embodiment of the present invention.

FIG. 4 is a diagram representing a unified interprocess communication (UIPC) configuration per card (per unit) embodying the principles of the present invention. It should be understood that, in the drawing, "task" is used interchangeably with "process".

Referring to FIG. 4, UIPC 30 (unified interprocess communication 30) included in each card (unit) is largely divided into UIPC API 60 (unified interprocess communication application program interface 60), and UIPC protocol stack 70 (unified interprocess communication protocol stack 70). The division of UIPC 30 is intended to more effectively distinguish the interprocessor communication requiring the unified interprocess communication (UIPC) protocol stack 70 from the intraprocessor communication not requiring the unified interprocess communication (UIPC) protocol stack 70. The interprocessor communication involves a destination network address N_ADDR which corresponds to a card, process, or destination different from the card originating the message, so that messages had to be transported from its card to another card. The intraprocessor communication involves a destination network address N_ADDR which corresponds to a card, process, or destination which is the same as the card originating the message, so that messages are directly transported to a corresponding task inside the card.

Meanwhile, UIPC API 60 is provided in the form of a library, being called from a task. In general, a task calls UIPC API 60 for transceiving messages, and communicates with the unified interprocess communication (UIPC) protocol stack 70 to handle the messages in the interprocessor communication.

UIPC API 60 according to the embodiment of the present invention is further explained in detail with reference to FIG. 4.

UIPC API (60)

Unified interprocess communication (UIPC) application program interface (API) 60 is a common library which can be shared with any kind of task (process), and provides an interface associated with every inter performance which the unified interprocess communication (UIPC) 30 provides. In other words, UIPC API 60 provides an interface for enabling any type of application task to be able to use a unified interprocess communication (UIPC) function. In addition, UIPC API 60 determines inter and intra process communication paths based on the network address N_ADDR and application identifier APP_ID. In the meantime, UIPC API 60 does not use the unified interprocess communication (UIPC) protocol stack 70 for intraprocessor communication. Furthermore, UIPC API 60 searches out the network address N_ADDR, trying to find the physical address of a corresponding application task (process), and if intraprocessor communication is involved, it transports messages directly to a message queue of a corresponding task (process) through the OIA application program interface (API) which is provided by the OIA layer 54 of FIG. 3. On the other hand, if interprocessor communication is involved, UIPC API 60 transports messages to a message queue of the unified interprocess communication (UIPC) protocol stack 70 for routing in search of a destination.

One of the most critical functions which the UIPC API 60 provides to the task (application) is a common task architecture of the common software platform 32, which enables the task to use the unified interprocess communication (UIPC). Major functions of the common task architecture according to the present invention are listed below.

1. Developers no longer need to redesign the task structure.

2. Asynchronous callback function is performed on the task of a caller.

3. Developers do not have to work on integration of common components (e.g., common operation administration and maintenance (OAM)) and applications.

4. Communication between tasks based on the message queue method is now possible because it is a common interprocess communication (IPC) mechanism that all operating systems provide.

Figure 5:
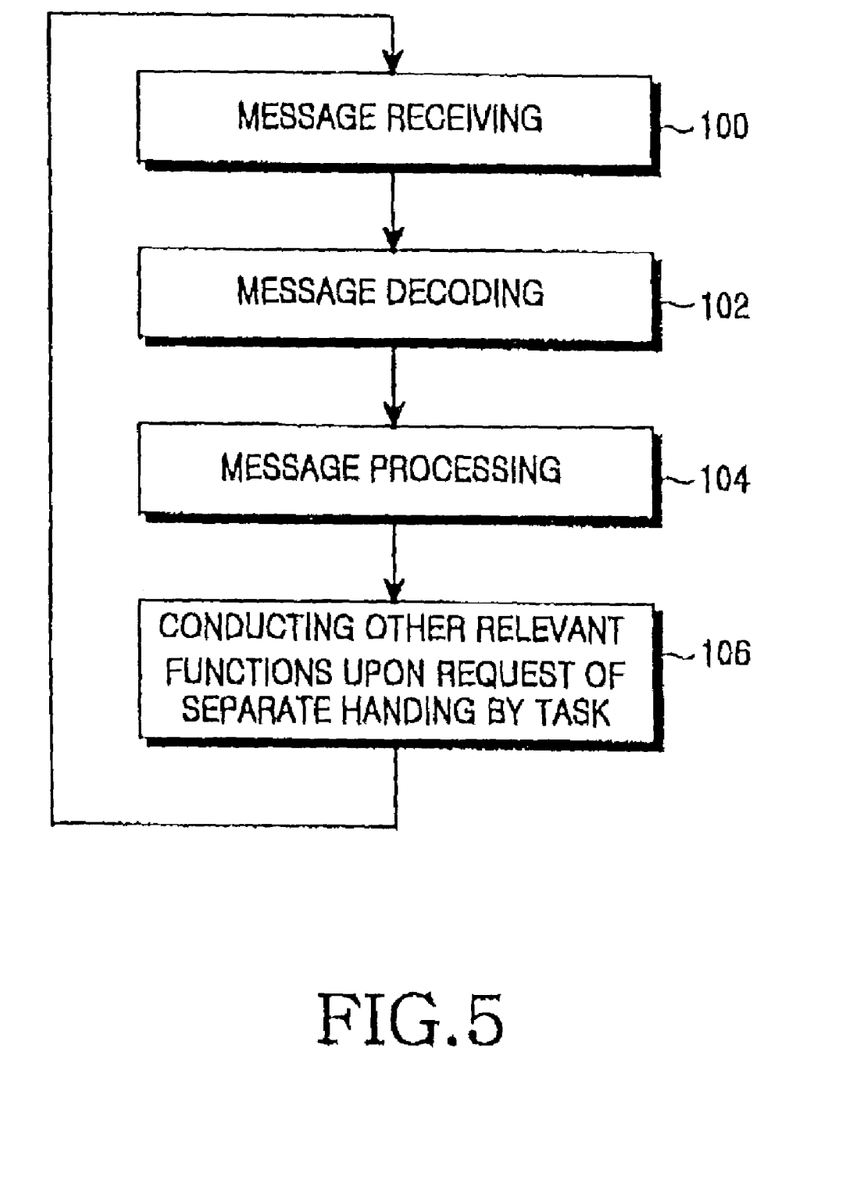
FIG. 5 is a flow-chart of a process using the structure of a common task architecture, that is, a basic control flow chart of a task.

Among the components of the common software platform 32 (horizontal components and vertical components), the software application of an upper block of the unified interprocess communication (UIPC) layer 30 (for example, common agent task 40, common operation administration and maintenance (OAM) task 42 and so forth) is successfully implemented by using the common task architecture embodying the principles of the present invention. FIG. 5 is a basic common control flow of a task (process) using the common task architecture structure with those four functions described above.

Referring to FIG. 5, the task waits for its message using a queue. The task receives a message asynchronously (S100), decodes and analyzes the received message (S102), and carries out message processing and disposition (S104). If a separate disposition is required, the task processes other specific application (S106), and then waits for a message going back to step 100.

Table 1 and Table 2 show results of the comparison of a legacy task architecture with the common task architecture of a task having a basic common control flow shown in FIG. 5 according to the present invention.

Table 1 shows a legacy architecture that is not in accordance with the principles of the present invention. Table 2 shows a task architecture of a task having a basic control flow, in accordance with the principles of the present invention.

As illustrated in Table 1, since the legacy task is not a common structure, it should be designed individually with different formats in conforming to developers and task performances. Therefore, even if a task has a considerable overhead during the development period, it has to be redesigned. On the contrary, the common task architecture according to the present invention, as shown in Table 2 below, is implemented so as to have a basic common control flow of the task like the one illustrated in FIG. 5, which is free of overhead. In this manner, the developing time is greatly shortened using the principles of the present invention.

TABLE 1

<Legacy Task Architecture>

```
PerformanceTaskMain( )
{
        /*Task Initialization and component library Initialization */
                performanceTaskinit( );
        /*Loop forever receiving messages on the main queue*/
        FOREVER
                rcvMsg(myQ,&pMsg)
                switch (msgType)
                case PERFORMANCE_TYPE_MSG
                        Invoke performance component library to handle
message
                case MY_MSGS
                        process message
                end switch
        /* other processing before receiving next message */
}/* end of taskMain */
```

TABLE 2

<Common Task Architecture>

```
taskMain( )
{
        /*Task Initialization and component library Initialization */
                Uipc_InitTaskContext( );
        /* Create a message queue that can be used by a task for UIPC
*/
                Uipc_CreateQueue(MY_APP_ID,&hMyQueue);
        /* The Uipc_RcvLoop( ) of a task waits on this Queue to
receive messages */
                Uipc_SetmainQueue(hMyQueue);
        /* Register to receive messages of a particular class */
                Uipc_RegisterMsgHandler (MY_MSG_CLASS,
&MyMessageHandler);
                /* Uipc_RcvLoop( ) will call the registered idle handler after it
is      done processing messages and there are no more messages in
the     queue */
                Uipc_RegisteridleHandler(&MyidleHandler);
                /* Loop forever receiving messages on the main queue */
                ] Uipc_RcvLoop( );
}
```

The common task architecture depicted in Table 2 is now detailed with reference to FIG. 6, in accordance with the principles of the present invention.

Figure 6:
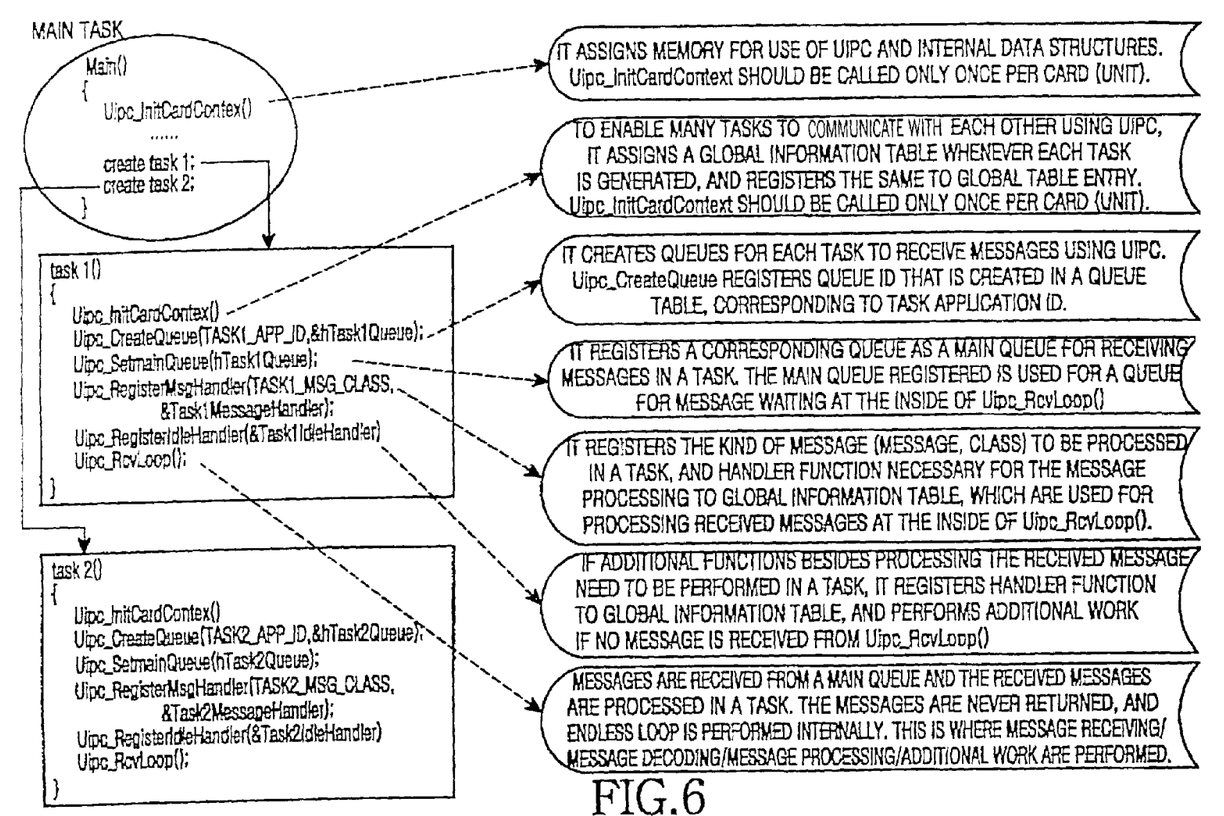
FIG. 6 is a diagram for explaining a unified interprocess communication (UIPC) application program interface (API) configuration and a common task architecture in accordance with the preferred embodiment of the present invention.

FIG. 6 is an explanatory diagram for unified interprocess communication (UIPC) application program interface (API) configuration and the common task architecture according to the present invention. Referring to FIG. 6, a main task of each card is to generate a global information table, similar to the one shown in Table 3, at the inside of the unified interprocess communication (UIPC), and generates server tasks, task 1 and task 2, carrying out their own specific functions (e.g., alarm task, performance task and so on).

a task control block (TSB). Each task control block is supposed to possess uniformly designated information.

First field of the task control block is 'task ID'. Second field of the task control block is 'application ID', which is the 'application ID' of the 'main queue' of the task.

Each task has a dynamic message handler table, a static message handler table, and a dynamic message class table. Every time the task invokes Uipc_RegisterOneTimeApi( ), an entry is created in the dynamic message handler table. Such task in the dynamic message handler table is not permanent. In fact, the entry is deleted as soon as a response is received from application program interface (API). The dynamic message handler table could be implemented by using balanced binary trees. Whenever a task creates Uipc_RegisterMsgHandler( ), an entry is generated at the static message handler table. In this case, the static message handler table is exclusively used for the application program interface (API) of a supervisor. Unlike the entry in the dynamic message handler table, the entry in the static message handler table is permanent. Thus, the static message handler table can be implemented. Whenever a task invokes Uipc_GenerateTempMsgClass( ), the message class returns to the above described task, and any necessary updating takes place in the dynamic message class table, making a particular message class busy. Also, whenever the task invokes Uipc_FreeTempMsgClass( ), the unified interprocess communication (UIPC) makes necessary modification to the dynamic message class table so as to make a particular message class available for later use. The dynamic message class table is implemented as another array.

The global information table includes pointers for every aforementioned table. Furthermore, the global information table includes a pointer for 'Idle Message Handler' function of the task. The global information table also includes latency time, which is supposed to be used within Uipc_RcvLoop( ) only of each task. Within the Uipc_RcvLoop API, the global information table will be questioned as to the latency time. Now that every task is accessible to the global information table, a designated semaphore signal protects the global information table. Such semaphore signal is generated during Uipc_InitCardContext( ).

Referring back to FIG. 6, at the unified interprocess communication (UIPC) application program interface (API), Uipc_InitCardContext( ) is supposed to initiate the unified interprocess communication (UIPC) 30 in accordance with the present invention. Uipc_InitCardContext( ), which is run by the main task, assigns a memory for use of unified interprocess communication (UIPC) 30, which generates an intra-data structure. In this case, Uipc_InitCardContext( ) should be called only once for each card (unit).

TABLE 3

| Task ID | Application ID | Pointer for task's dynamic message handler table | Pointer for task's static message handler table | Pointer for task's dynamic message class table | Pointer for task's idle message handler | Waiting time used within Uipc_RcvLoop( ) |
| --- | --- | --- | --- | --- | --- | --- |

To explain more about the unified interprocess communication (UIPC) global information table at the inside of the unified interprocess communication (UIPC), the global information table includes information about all tasks at a particular card. Each entry in the global information table is Further explanation follows in connection with a common task architecture of dependent tasks, task 1 and task 2, which are generated by the main task.

At the common task architecture, Uipc_InitTaskContext( ) assigns a global information table whenever a task is generated to help many tasks to be able to communicate with one another using unified interprocess communication (UIPC) 30, and registers the global information tables assigned to a global table entry. Again, Uipc_InitTaskContext( ) should be called only once for each task.

Uipc_CreateQueue(TASK1_APP_ID, & Task1Queue) creates a queue to help each task to be able to receive messages using unified interprocess communication (UIPC). Uipc_CreateQueue(TASK1_APP_ID,&Task1 Queue) registers a queue identifier in a queue table as an application identifier of a task.

Uipc_SetmainQueue(hTask1Queue) sets a corresponding queue as a main queue for receiving messages. Once it is registered as the main queue, it is used as a message wait queue at the inside of Uipc_RcvLoop( ).

Uipc_RegisterMsgHandler(TASK1_MSG_CLASS, &Task1MessageHandler) registers messages (message class) to process the messages received from a task, and handler function for message processing in a global information table. They are used for processing messages received at the inside of Uipc_RcvLoop( ).

Uipc_RegisterIdleHandler(&Task1IdleHandler) registers a handler function in a global information table as a task intended to perform additional functions besides message processing, carrying out additional work given that no message is received from Uipc_RcvLoop( ).

Uipc_RcvLoop( ) relates to the situation where a task receives messages from the main queue and processes the received messages. It never returns, but performs a limitless loop internally. Furthermore, it performs tasks like message receiving/message decoding/message processing/additional work.

Unified interprocess communication (UIPC) protocol stack 70 of unified interprocess communication (UIPC) 30 is now detailed with reference to FIG. 4.

UIPC Protocol Stack 70

Unified interprocess communication (UIPC) protocol stack 70 is provided for interprocessor communication. Interprocessor communication takes place when UIPC API 60 transmits a message using a queue out of unified interprocess communication (UIPC) protocol stack 70. Unified interprocess communication (UIPC) protocol stack 70 requires a routing library for determining a message route, based on application identifier APP_ID, and network address N_ADDR. For routing, UIPC API 60 calls application program interface (API) provided by the routing library, using application identifier APP_ID and network address N_ADDR, and decides whether the message received is an interprocess message or an intraprocess message. If it is an interprocessor message, UIPC API 60 transmits the message to a queue of unified interprocess communication (UIPC) protocol stack 70. Typically, the protocol stack conforms to the OSI (Open System Interconnection) model, but in the present invention, it does not support all of the seven layers, but only three layers. To be more specific, unified interprocess communication (UIPC) protocol stack 70 embodying the principles of the present invention supports a data link layer 72, a network layer 74, and a transport layer 76. Data link layer 72 has a data link queue. Network layer 74 has a network queue. Transport layer 76 has a transport queue.

The performances of those three layers will be explained in detail later. Before getting into further details on each layer, however, it is necessary to introduce some general requirements which are applied to each layer. This is done with the intention of implementing the above described layers.

First, a header for each layer should include a protocol discriminator. The discriminator indicates whether a certain protocol or a combination of protocols is accompanied with a message. Generally, the protocol discriminator comprises two or three bits in a header. This implementation will be continued without changing other protocols. For instance, a received message being processed by network layer 74 has a protocol discriminator in a network layer header which designates which protocol module should process the message next. If the unified interprocess communication (UIPC) is intended to support transport layer protocols like TCP (Transmission Control Protocol) or UDP (User Datagram Protocol), the protocol discriminator informs the network layer 74 as to whether or not the message should be transported to the TCP or UDP module. At this point, the UDP refers to Internet standard network layer, transport layer, and session layer protocols that provide datagram services. The UDP, similar to TCP, is a connectionless protocol on a top level layer of IP.

Some protocol layers are dependent on other layers, and also, it is difficult to use some protocol layers independently. For example, there is LAPD, a data link layer protocol dependent on a physical HDLC (high level data link control) layer. Here, "LAPD" means link access procedure on D channel.

Each layer has a message priority. Therefore, messages or segments with high priorities (segments, if a message is long enough to be segmented) are transported before other messages or segments. Preferably, two priorities, that is, "Normal" and "High", are introduced in the present invention since further division would only make things more confusing. However, if necessary, additional division could be done on the priorities at any time.

Moreover, each layer can define specific control messages which are exchanged between the same layers at an endpoint. Such control messages negotiate protocol parameters with a layer or allow one layer to perform flow control.

The following describes the characteristics and responsibilities of each protocol layer. Each part has a primitive list which is given by each layer. The primitives are supposed to allow an external interface (that is, a next protocol layer) to be provided to another software. They do not necessarily explain actual messages that are communicated between two endpoints. Also, no explanation will be given on the messages and definitions of their state machines because they will be defined when a more concrete design is set.

The primitives will be named in conformity with the terminology system of ITU (International Telecommunication Union), and will be classified to be "Request", "Response", "Indication", and "Confirm" as follows.

Request: This means a function which a layer should support, and usually a next layer of the layer invokes it to request a certain operation.

Response: This is invoked by a distant or remote terminal when an order asking for a response is received. In consequence, a requestor generating the above 'Request' would receive the confirmation.

Indication: This is a notice reporting that an event has taken place. Usually, it indicates a next layer ascending, or means that a code which is generated later receives such orders. Most of the time, an 'Indication' is the result of the distant (remote) terminal initiating a certain operation through a 'Request'.

Confirm: This is a confirmation in response to the 'Request'.

Each primitive has data having a designated primitive associated therewith. The mechanism for passing through the primitive between the layers will not be explained in detail here since it is a part of the detailed design of the layers.

On the other hand, it is very important to be aware of the necessity of defining a maximum transmission unit (MTU). The maximum transmission unit (MTU) defines a maximum message size. Any message under the maximum size can be transmitted as a single message.

In fact, determining the maximum transmission unit is a part of an application design. Therefore, it is not defined as a part of the unified interprocess communication (UIPC). However, the unified interprocess communication (UIPC), to designate the maximum transmission unit (MTU), defines a visible internal application program interface (API) for the unified interprocess communication (UIPC) components only. The maximum transmission unit (MTU) is determined based on the requirements for performing an application, number of a hop that a message is supposed to take (a "hop" is a section between a router and a router), and communication link rate currently being used.

There can be a lot of complex problems with networks for guiding message paths from one node to the next node. For example, if the maximum transmission unit (MTU) is not the same for each hop, something has to be done to solve the imbalance. However, a problem sometimes occurs when a node transmits a message having a large maximum transmission unit (MTU), and this message is broadcast through another node after going beyond its hop with a small maximum transmission unit (MTU). Of course, it will be very difficult for a certain node to know every maximum transmission unit (MTU) of every link through which a message travels. An originating node might not even know to which links the message are transmitted. All the originating node knows is how to send the message to the next node. Therefore, the protocol stack of each node should be able to overcome the discrepancy in maximum transmission unit (MTU) sizes of the links connected to a corresponding node. Network Layer 74, although it will be described later in the section entitled "Network Layer 74", has a segmentation function. This should be utilized for segmenting a large maximum transmission units (MTU) into smaller maximum transmission units (MTU). If a network layer intends not to carry out the segmentation, an end-to-end connection can be tried as an alternative, wherein all nodes partake in a discussion for determining a maximum transmission unit (MTU). Unfortunately however, this method generates overhead and is less effective for connectionless messages.

Data Link Layer 72

Among the three layers which the unified interprocess communication (UIPC) protocol stack 70 supports, data link layer 72 is first explained. Data link layer 72 connects a data link between endpoints, is responsible for error-free data transmission between links, and provides the following functions.

1. It does queuing by offering data priorities.

2. It supports a smooth transceiving of data by providing a flow control.

3. It supports error-free data transmission.

4. It provides a connectionless mode and a connection-oriented mode, and in the case of the connection-oriented made, it connects/releases data links.

5. When there is an error, it can retransmit corresponding data.

Table 4 is a summary of connection-oriented mode primitives at the data link layer 72 which are required of connection-oriented data links at the least, and their description. Table 5 is a summary of connectionless mode primitives at the data link layer 72 which are required of connectionless data links at the least, and their description.

TABLE 4

<Connection-oriented Mode Primitives at Data Link Layer 72 and Description thereof>

| Service | Primitive | Description |
|---|---|---|
| Link Setting | DL-CONNECT request | It initiates a connection to a remote end or to a physical channel. |
| | DL-CONNECT indication | It is received when a remote end initiates a connection to you. |
| | DL-CONNECT response | It is invoked by DL-CONNECT indication receiver to accept the connection. |
| | DL-CONNECT confirm | It is notified to a connection starter telling that a remote end accepted to the connection. |
| Normal Data Transmission | DL-DATA request | It is used by a transmitter for data transmission. |
| | DL-DATA indication | It is taken to a receiver for data receiving. |
| Link Release | DL-DISCONNECT request | Either a transmitter or a receiver can initiate the connection release. No response. |
| | DL-DISCONNECT indication | It is received when a remote end releases the connection. |

TABLE 5

<Connectionless Mode Primitives at Data Link Layer 72 and Description thereof>

| Service | Primitive | Description |
|---|---|---|
| Link Setting | DL-DATA request | A transmitter uses it for data transmission. |
| | DL-DATA indication | A receiver uses it for data receiving. |

Explained below is network layer 74 among the three layers supported by unified interprocess communication (UIPC) protocol stack 70. Network layer 74 is in charge of message routing between processors in interprocessor communication. The following describes the functions of Network layer 72.

1. It Provides a Message Routing Function.

It determines message routes based on network address N_ADDR. More particularly, network layer 72 determines whether a message should be sent to a transport layer as the message of a process, or the message should be transported through another interface to arrive at the final destination.

2. It Supports Segmentation and Reassembly of Messages.

At the time of message routing, it segments and reassembles messages in the case where a message is sent to an interface having a maximum transmission unit (MTU) different from that of the data link layer.

3. It Performs a Stateless Operation.

Because network layer 74 does not support the message retransmission function, it performs a stateless operation without a state machine. Once a message is transmitted, the transmitted message is not saved and later vanishes, regardless of whether or not a receiver receives the message. If more reliable transmitting/receiving messages is required between endpoints, it is taken to transport layer 76.

Unified interprocess communication (UIPC) 30 defines additional address relevant primitives so as to possess an interface capable of carrying out the performances of the above described network layer 74. Table 6 below is a summary of network layer 74 primitives and a description thereof.

TABLE 6

<Primitives at Network Layer 74 and Description thereof>

| Service | Primitive | Description |
| --- | --- | --- |
| Normal Data Transmission | N-DATA request | A transmitter uses it for data transmission. |
| | N-DATA indication | A receiver uses it for data receiving. |

Lastly, transport layer 76 among the three layers supported by unified interprocess communication (UIPC) protocol stack 70 is now explained. In general, transport layer 76 is responsible for end-to-end communication between tasks. The following explains more about the functions of transport layer 76.

1. It Provides a Message Routing Function.

It transports a received message to a destination application. To this end, the transport layer 76 is in charge of building a routing table based on the application identifier APP_ID. The routing table can be approached through an internal application program interface (API) for the use of UIPC API 60.

2. It Provides a Connectionless Mode and a Connection-Oriented Mode.

The connectionless mode is used under the condition that underlying layers (e.g., data link layer) secure reliability between end-to-end so as to reduce overhead during communication. Therefore, in the connectionless mode, as in the data link layer 72, whether a destination application received the message is not checked at all. In the connection-oriented mode, on the other hand, the connection of end-to-end applications should be set up so as to be able to transmit/receive messages, which is similar to a socket of TCP (Transmission Control Protocol) in terms of function. In addition, since the connection-oriented mode has additional overhead and is very complicated at the time of setting/releasing the connections, it is preferable not to use this mode too often, especially when an underlying layer has relatively low reliability and when there are not many requests for real-time communication.

3. It Provides a Message Multiplexing Function.

When a number of messages are received from many applications, the transport layer 76 combines the messages based on the network address N_ADDR of the originating place, and transports the combined messages to a corresponding application.

Table 7 is a summary of connection-oriented mode primitives at the transport layer 76 which are required for an external interface function, and description thereof, while Table 8 is a summary of connectionless mode primitives at the transport layer 76 which are required for an external interface function, and description thereof.

TABLE 7

<Connection-oriented Mode Primitives at Transport Layer 76 and Description thereof.>

| Service | Primitive | Description |
| --- | --- | --- |
| Link Setting | T-CONNECT request | It initiates a connection to an application. Its response is associated with a queue handler. |
| | T-CONNECT indication | It is received when a remote end initiates a connection to an application. |
| | T-CONNECT response | It is invoked by T-CONNECT indication receiver to accept the connection. |
| | T-CONNECT confirm | It is notified to a connection starter telling that a remote end accepted the connection. |
| Normal Data Transmission | T-DATA request | It is used by a transmitter for data transmission. |
| | T-DATA indication | It is taken to a receiver for data receiving. |
| Link Release | T-DISCONNECT request | Either a transmitter or a receiver can initiate the connection release. No response. |
| | T-DISCONNECT indication | It is received when a remote end releases the connection. |

TABLE 8

<Connectionless Mode Primitives at Transport Layer 76 and Description thereof>

| Service | Primitive | Description |
| --- | --- | --- |
| Normal Data Transmission | T-DATA request | A transmitter uses it for data transmission |
| | T-DATA indication | A receiver uses it for data receiving. |

A general procedure for transporting message data from an originating task to a terminating task embodying the principles of the present invention is now explained below with reference to FIGS. 1 through 6.

An originating task, to transport a message to a destination task, calls the Uipc_SendMsg(data,destinationAddress) function, which is capable of accommodating the destination task's network address N_ADDR, application identifier APP_ID, and message data, from unified interprocess communication (UIPC) application program interface (API). After that, the task loads the destination task's network address N_ADDR, application identifier API_ID, and message data upon the Uipc_SendMsg(data,destinationAddress) function, and UIPC API 60 decides whether the destination address, that is, the network address N_ADDR is the same as the network address of its own card. If the destination address, or the network address, is the same as the network address of its own card, the intraprocessor communication unified interprocess communication (UIPC) transports the message to the destination. However, if the destination address is not identical to the network address of its own card, the interprocessor communication unified interprocess communication (UIPC) transports the message to the destination. If the network address N_ADDR, loaded upon the Uipc_SendMsg(data,destinationAddress) function, is the same as the network address of its own card, i.e., the intraprocessor communication unified interprocess communication (UIPC), the UIPC API 60 transports the message directly to a message queue of the destination task within the card through the OIA application program interface (API) library which is provided by the OIA layer 54 depicted in FIG. 3. In a case wherein the intraprocessor communication unified interprocess communication (UIPC) is concerned, the protocol stack 70 is not used at all. Meanwhile, having received the message, the destination task controls relevant functions, such as, message receiving, message decoding, message processing, and other processes separately done by the task upon request, based on the basic common control flow of the common task architecture shown in FIG. 5 and FIG. 6, by using the Uipc_RevLoop( ) function.

On the other hand, if the destination address, or the network address N_ADDR, is not the same as the network address of its own card, that is, if it is the interprocessor communication unified interprocess communication (UIPC), UIPC API 60 transports the message to the message queue of unified interprocess communication (UIPC) protocol stack 70 for routing in search of an external destination. More specifically, UIPC API 60 transports the message to a transport queue of unified interprocess communication (UIPC) protocol stack 70. Then, transport layer 76 conducts the transport layer's specific operation on the message sent to the transport queue, processes the message, and sends the processed message to a network queue of network layer 74. Network layer 74 conducts the network layer's specific operation on the message sent to the network queue, and transports the message to a data link queue of data link layer 72. Similarly, data link layer 72 conducts the data link layer's specific operation on the message sent to the data link queue, and transports the message to DIA layer (please refer to 46 of FIG. 3), device drivers 48 of the destination card through the DIA layer (please refer to 46 of FIG. 3), and device drivers 48.

Later, the message transmitted to the DIA layer (please refer to 46 of FIG. 3), device drivers 48 of the destination card is forwarded to the destination task through data link layer 72, network layer 74, and transport layer 76 of the protocol layer 70. Also, network address N_ADDR and application identifier APP_ID can be used to find out the destination card and the destination task. The destination task is also known as the terminating place task. An originating task is also known as an originating place task.

Accordingly, the destination task has control over relevant performances, such as message receiving, message decoding, message processing, and other processes separately done by the task upon request, based on the basic common control flow of the common task architecture shown in FIG. 5 and FIG. 6, by using the Uipc_RcvLoop( ) function provided by unified interprocess communication (UIPC) application program interface (API) library.

Table 9 below illustrates a program concerning the Uipc_SendMsg(data, destinationAddress) function, which is performed within a task, having been called by UIPC API 60.

TABLE 9

```
Uipc_SendMsg(data,destinationAddress)
{
    If(destinationAddress==myAddress) /* UIPC of tasks withinCard
(Unit)*/
    {
        1. Get Destination Queue ID → DestQueue
        2. Send data to another task with DestQueue by OIA →
        Oia_WriteQbyId(DestQueue,AppData);
    }
}
```

TABLE 9-continued

```
else/* UIPC of tasks between Cards (Units)*/
{
    Send data to "UIPC STACK Transport Task Queue"
        → us_AL_Transmit_TL(AppData)
        {Oia_WriteQbyId(TransportQueue,AppData);
```

Similarly, Table 10 below illustrates a program concerning the Uipc-RcvLoop( ) function, which is performed within a task, having been called by UIPC API 60.

TABLE 10

```
Uipc_RcvLoop( )
{
    Uipc_Rcv( )
    Oia_ReadQById(AppQueue,AppData) → REceiving a Message
    }
    Uipc_ProcessMsg(AppData)
    {Decoding and Processing a Message
    }
}
```

In conclusion, the unified interprocess communication (UIPC) of the present invention makes it possible for all applications (processes) to have a common structure through a structure called a common task architecture, and it eventually eases the burden of developing new communication systems and cuts the development time itself. Moreover, thanks to a common software platform, the combination of horizontal components and vertical components, there is no need to do extra work because of coming changes in operating systems and devices.

The foregoing paragraphs describe the details of the present invention, which relates generally to a communication system performing interprocess communication (IPC), and which more particularly relates to a unified interprocess communication (UIPC) method and apparatus which are independent of communication physical devices and operating system.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An interprocessor communication method for transporting messages from an originating place to a terminating place, the method comprising the steps of:
   providing an operating system-unified interface function at an operating system independent access (OIA) layer, the operating system-unified interface function being independently accessible by operating systems of a communication apparatus;
   providing a device-unified interface function at a device independent access (DIA) layer, the DIA layer being separate from the OIA layer, the device-unified interface function being independently accessible by physical devices of the communication apparatus;

at a unified process communication (UIPC) layer, determining when a message corresponds to interprocessor communication between different cards and to intraprocessor communication within a card;

at the UIPC layer, selecting one of the OIA layer and the DIA layer; and at the UIPC layer, transporting messages from the originating place to the terminating place through the selected one of the OIA layer and the DIA layer;

said determining, said selecting and said transporting being performed in accordance with information corresponding to the terminating place provided by an originating place task, and in accordance with a common task architecture based on a basic common control flow of the originating place task.

2. The method of claim 1, the unified interprocess communication layer comprising:

a unified interprocess communication application program interface (UIPC API) providing an interface for enabling a terminating place task to use a unified interprocess communication function, and for determining intraprocessor communication paths and interprocessor communication paths in dependence upon the information corresponding to the terminating place; and a unified interprocess communication protocol stack for routing between units for interprocessor communication using messages having traveling paths determined by the unified interprocess communication application program interface.

3. The method of claim 2, the unified interprocess communication protocol stack comprising:

a data link layer for connecting a data link between endpoints, and for transmitting error-free data between links;

a network layer message for routing between a plurality of tasks during the interprocessor communication; and a transport layer for performing end-to-end communications between a plurality of tasks.

4. The method of claim 2, the unified interprocess communication application program interface comprising a common library applicable to any kind of task.

5. The method of claim 1, the information corresponding to the terminating place comprising:

an application discriminator for discriminating a corresponding task for communication with the corresponding task; and a network address for locating a physical address of the corresponding task.

6. The method of claim 5, the network address comprising rack-shelf-slot-port information.

7. The method of claim 1, the basic common control flow of the originating place task including message receiving, message decoding, message processing, and a plurality of other functions to be carried out by a task upon request.

8. An interprocessor communication apparatus for transporting messages from an originating place to a terminating place, the apparatus comprising:

a processor;

an operating system independent access (OIA) layer for providing an operating system-unified interface function which is independently accessible to operating systems of a communication apparatus;

a device independent access (DIA) layer for providing a device-unified interface function which is independently accessible to physical devices of the communication apparatus, the DIA layer being separate from the OIA layer; and a unified interprocess communication (UIPC) layer for determining when a message corresponds to interprocessor communication between different cards and to intraprocessor communication within a card, for selecting one of the OIA layer and the DIA layer, and for transporting messages from the originating place to the terminating place through the selected one of the OIA layer and the DIA layer, said determining, said selecting and said transporting being performed in dependence upon information corresponding to the terminating place, the information being provided by an originating place task, the unified interprocess communication layer using a common task architecture based on a basic common control flow of the originating place task.

9. The apparatus of claim 8, the unified interprocess communication layer comprising:

a unified interprocess communication application program interface (UIPC API) providing an interface for enabling the originating place task to use a unified interprocess communication function, and for determining intraprocessor communication paths and interprocessor communication paths in dependence upon the information corresponding to the terminating place; and a unified interprocess communication protocol stack for routing between units for interprocessor communication using messages having traveling paths determined by the unified interprocess communication application program interface.

10. The apparatus of claim 9, the unified interprocess communication protocol stack comprising:

a data link layer for connecting a data link between endpoints, and for transmitting error-free data between links;

a network layer message for routing between a plurality of tasks during the interprocessor communication; and a transport layer for performing end-to-end communications between a plurality of tasks.

11. The apparatus of claim 9, the unified interprocess communication application program interface comprising a common library applicable to any kind of task.

12. The apparatus of claim 8, the information corresponding to the terminating place comprising:

an application discriminator for discriminating a corresponding task for communication with the corresponding task; and a network address for locating a physical address of the corresponding task.

13. The apparatus of claim 12, the network address comprising rack-shelf-slot-port information.

14. The apparatus of claim 8, the basic common control flow of the originating place task including message receiving, message decoding, message processing, and a plurality of other functions to be carried out by a task upon request.

15. An interprocessor communication method for transporting messages from an originating place to a terminating place, the method comprising the steps of:

providing a common task architecture having a basic common control flow of a task as an interface for unified interprocess communication (UIPC);

when an originating task provides a message and provides information corresponding to the terminating place using the common task architecture, identifying when the message corresponds to an intraprocessor communication within a card, and determining when the message corresponds to an interprocessor communication between different cards, said identifying and determining being performed in dependence upon the information corresponding to the terminating place;

when the message corresponds to the interprocessor communication between the different cards, transporting the message to a queue of a unified interprocess communication protocol stack for routing; and when the message corresponds to the intraprocessor communication within the card, transporting the message to a message queue of a corresponding task in the card through an application program interface library provided by an operating system independent access (OIA) layer;

said method further comprising the step of providing a device-unified interface function at a device independent access (DIA) layer, the DIA layer being separate from the OIA layer, the device-unified interface function being independently accessible by physical devices of a communication apparatus.

16. The method of claim 15, the unified interprocess communication protocol stack comprising:

a data link layer for connecting a data link between endpoints, and for transmitting error-free data between links;

a network layer message for routing between a first plurality of tasks during interprocessor communication; and a transport layer for performing end-to-end communications between a second plurality of tasks.

* * * * *